(12) United States Patent
Ben Moshe et al.

(10) Patent No.: US 10,593,064 B2
(45) Date of Patent: Mar. 17, 2020

(54) DYNAMIC DEPTH CAMERA SYSTEM CALIBRATION USING MOBILE DISPAY DEVICE

(71) Applicant: INTEL CORPORATION, Santa Clara, CA (US)

(72) Inventors: Sagi Ben Moshe, Kiryat Byalik (IL);
Ido Nissenboim, Zichron Yaakov (IL);
Aviad Zabatani, Even Yehuda (IL);
Erez Sperling, D.N. Menashe (IL);
Omer Sella, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 372 days.

(21) Appl. No.: 15/475,916

(22) Filed: Mar. 31, 2017

(65) Prior Publication Data

US 2018/0286079 A1 Oct. 4, 2018

(51) Int. Cl.
*H04N 13/02* (2006.01)
*G06T 7/80* (2017.01)
*H04N 5/232* (2006.01)

(52) U.S. Cl.
CPC ........... *G06T 7/85* (2017.01); *H04N 5/23222* (2013.01)

(58) Field of Classification Search
CPC ................................ H04N 13/246; G06T 7/85
See application file for complete search history.

(56) References Cited

U.S. PATENT DOCUMENTS

| | | | | |
|---|---|---|---|---|
| 5,974,180 A | * | 10/1999 | Schwendeman | H03M 7/3084 341/107 |
| 6,504,950 B1 | * | 1/2003 | Murashita | G09G 1/165 358/500 |
| 2010/0171646 A1 | * | 7/2010 | Yano | G08C 17/02 341/176 |

(Continued)

OTHER PUBLICATIONS

Zongqian."Camera calibration based on liquid crystal display (lcd)." The International Archives of the Photogrammetry, Remote Sensing and Spatial Information Sciences (Year: 2008).*

*Primary Examiner* — Fabio S Lima
(74) *Attorney, Agent, or Firm* — Finch & Maloney PLLC

(57) ABSTRACT

In accordance with disclosed embodiments, there is described a depth camera calibration system which includes: a depth camera to be calibrated; a calibration application to execute upon a mobile device, the calibration application to: (i) determine a precise image size of a calibration image to be displayed to a screen of the mobile device based on a screen size of the mobile device, the calibration image having embedded therein a plurality of objects of a known size, (ii) encode the known size of the objects into an optical machine-readable data representation, and (iii) display the encoded optical machine-readable data representation to the mobile device; in which the depth camera is to read the optical machine-readable data representation displayed by the mobile device to determine the known size of the objects of the calibration image; in which the calibration application is to display the calibration image to the mobile device; and in which an imager of the depth camera is to capture the objects of the coded image pattern and calibrate based on the known size of the objects of the captured calibration image. Other related embodiments are disclosed.

25 Claims, 14 Drawing Sheets

(56) References Cited

U.S. PATENT DOCUMENTS

| | | | | |
|---|---|---|---|---|
| 2012/0105585 A1* | 5/2012 | Masalkar | ............... | G06F 3/017 348/46 |
| 2012/0287287 A1* | 11/2012 | Grossmann | .......... | H04N 17/002 348/181 |
| 2013/0190020 A1* | 7/2013 | Ekberg | ................... | H04L 51/20 455/466 |
| 2014/0098244 A1* | 4/2014 | Ghazizadeh | ....... | H04N 5/44508 348/189 |
| 2014/0111621 A1* | 4/2014 | Sneyders | .......... | G01B 11/2545 348/46 |
| 2015/0189267 A1* | 7/2015 | Kaji | ......................... | G06T 7/80 348/187 |
| 2015/0206367 A1* | 7/2015 | Goldman | .......... | G07C 9/00309 340/5.61 |
| 2016/0182889 A1* | 6/2016 | Olmstead | .............. | H04N 19/17 348/47 |
| 2017/0131089 A1* | 5/2017 | Bronstein | ............ | H04N 5/2256 |
| 2018/0286079 A1* | 10/2018 | Ben Moshe | ....... | H04N 5/23222 |

* cited by examiner

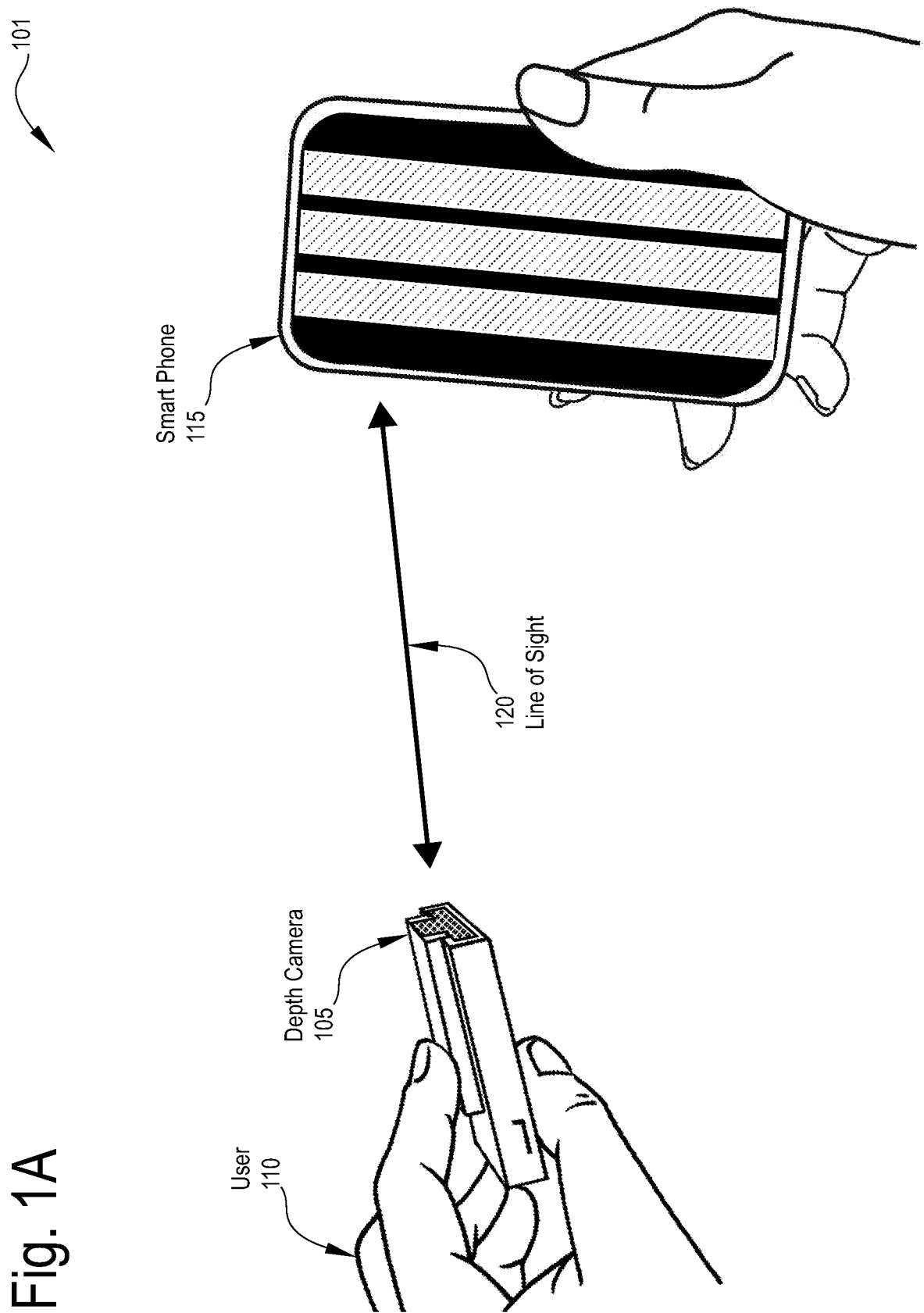

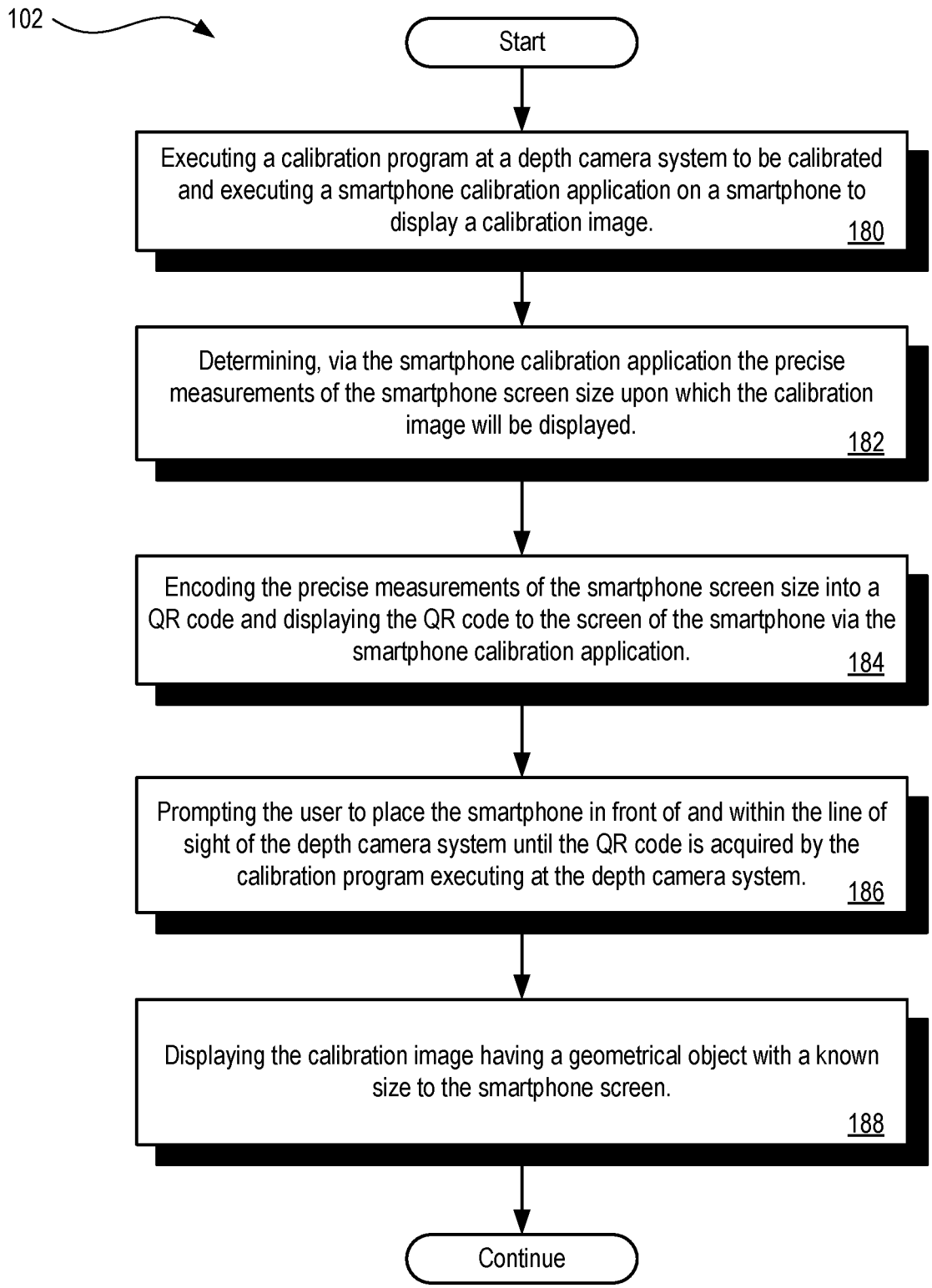

Prompting the user to acquire one or more images of the displayed calibration image having the geometric object therein.
190

↓

Applying 2D image processing to detect the expected geometrical pattern in the captured one or more images of the geometric object.
192

↓

Applying optimization processing to the depth camera's parameters using the geometrical pattern from the geometric object un-projected into 3D space.
194

↓

Determining, via the optimization processing, a delta between geometrical pattern ground truth dimensions against the un-projected geometrical pattern dimensions captured by the depth camera from the displayed geometric object of the calibration image.
196

↓

End

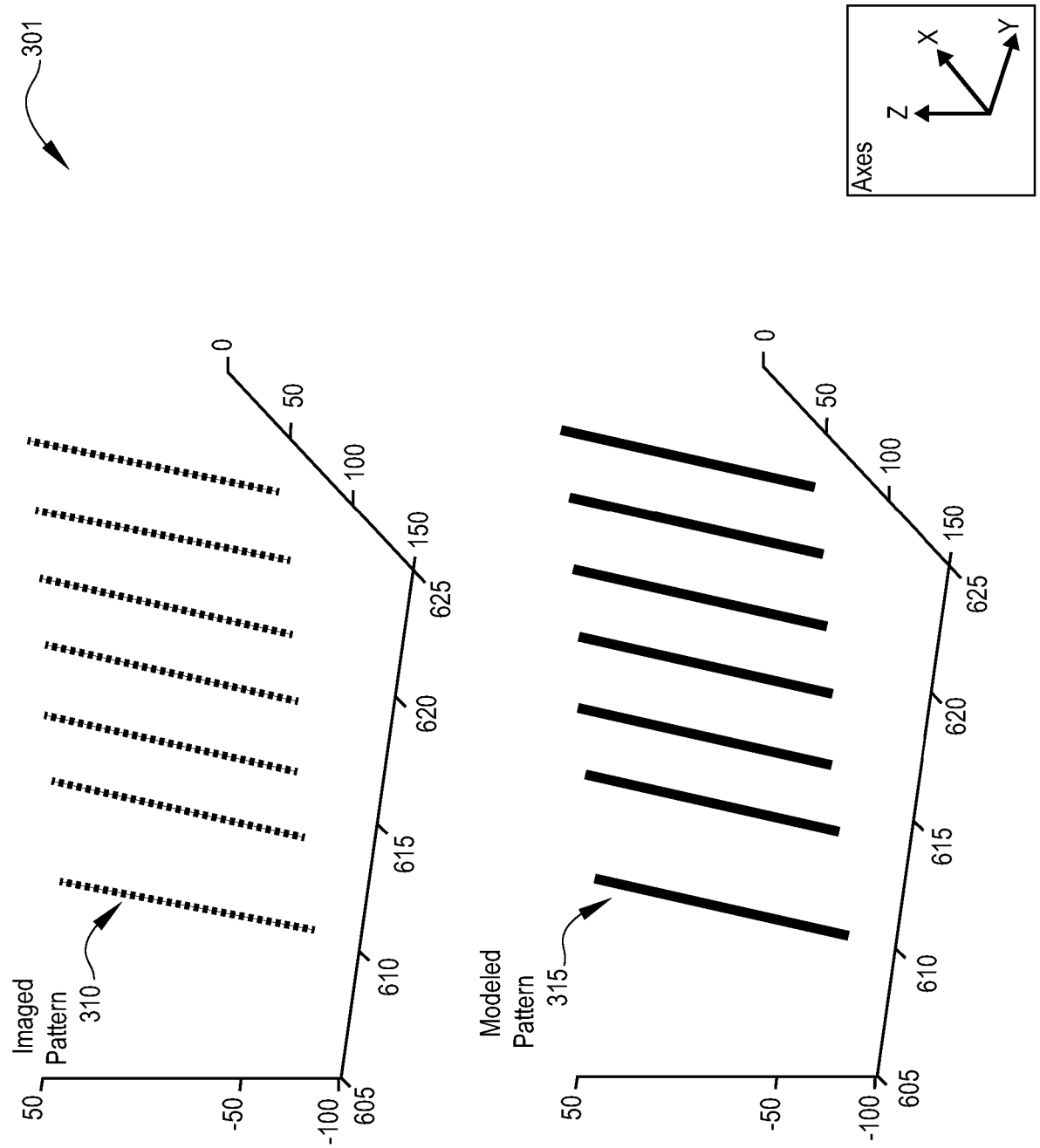

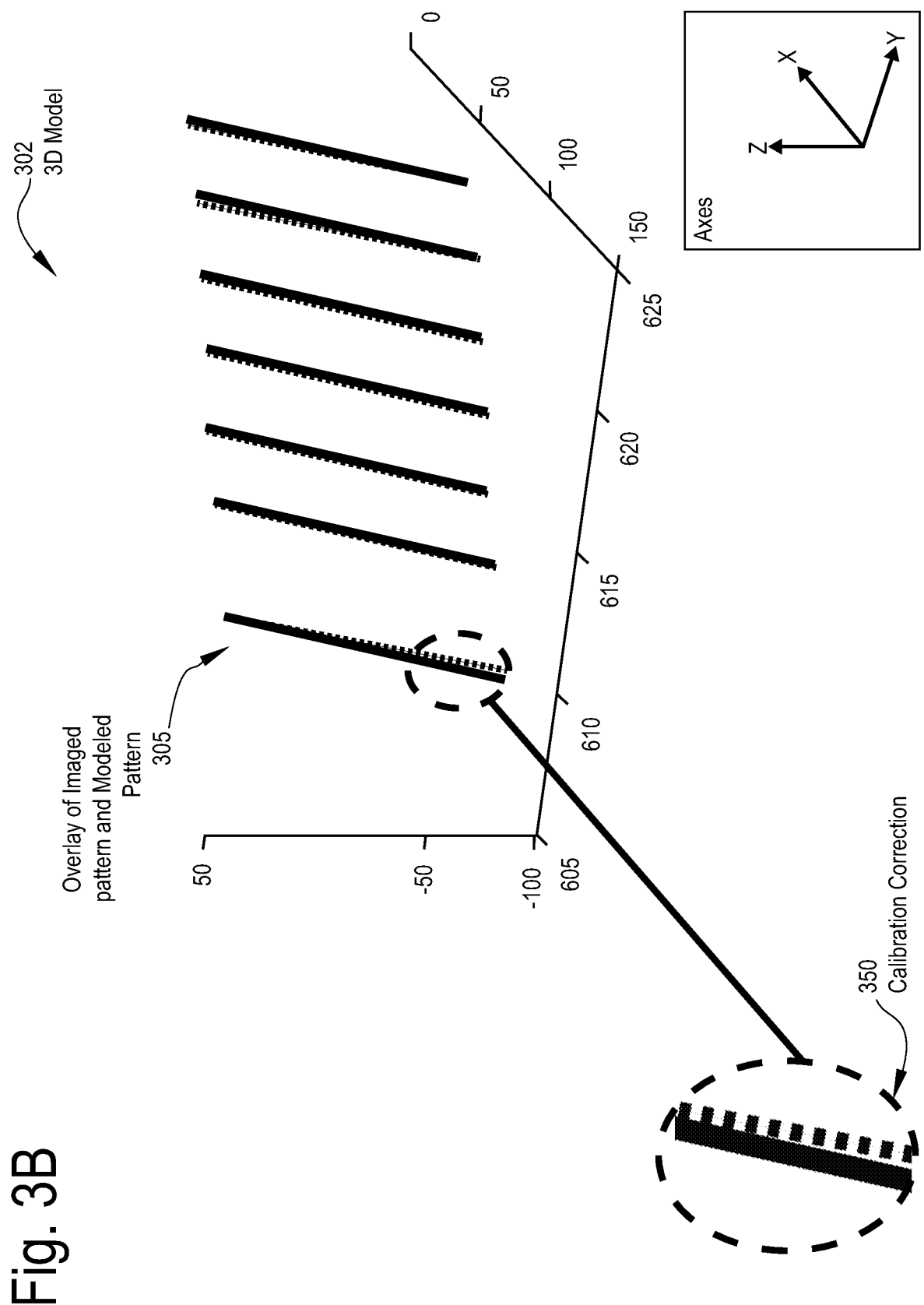

Start

Performing smartphone based dynamic depth camera calibration, by:
505

Executing a smartphone calibration application via a processor and a memory of a smartphone.
510

Executing a calibration program at a depth camera to be calibrated.
515

Determining, via the smartphone calibration application, a precise image size of a calibration image to be displayed to a screen of the smartphone based on a screen size of the smartphone, the calibration image having embedded therein a plurality of objects of a known size.
520

Encoding, via the smartphone calibration application, the known size of the objects into an optical machine-readable data representation.
525

Displaying, via the screen of the smartphone, the encoded optical machine-readable data representation.
530

```
                    ( Continue )
                         │
                         ▼
┌─────────────────────────────────────────────────────────┐
│ Reading, via the calibration program executing at the   │
│ depth camera, the optical machine-readable data         │
│ representation displayed by the smartphone to           │
│ determine the known size of the objects of the          │
│ calibration image.                                  535 │
└─────────────────────────────────────────────────────────┘
                         │
                         ▼
┌─────────────────────────────────────────────────────────┐
│ Displaying, via the screen of the smartphone, the       │
│ calibration image.                                      │
│                                                     540 │
└─────────────────────────────────────────────────────────┘
                         │
                         ▼
┌─────────────────────────────────────────────────────────┐
│ Capturing, via an imager of the depth camera, the       │
│ objects of the coded image pattern.                     │
│                                                     545 │
└─────────────────────────────────────────────────────────┘
                         │
                         ▼
┌─────────────────────────────────────────────────────────┐
│ Calibrating, via the calibration program executing at   │
│ the depth camera, the depth camera based on the known   │
│ size of the objects of the captured calibration image.  │
│                                                     550 │
└─────────────────────────────────────────────────────────┘
                         │
                         ▼
                    ( Continue )
```

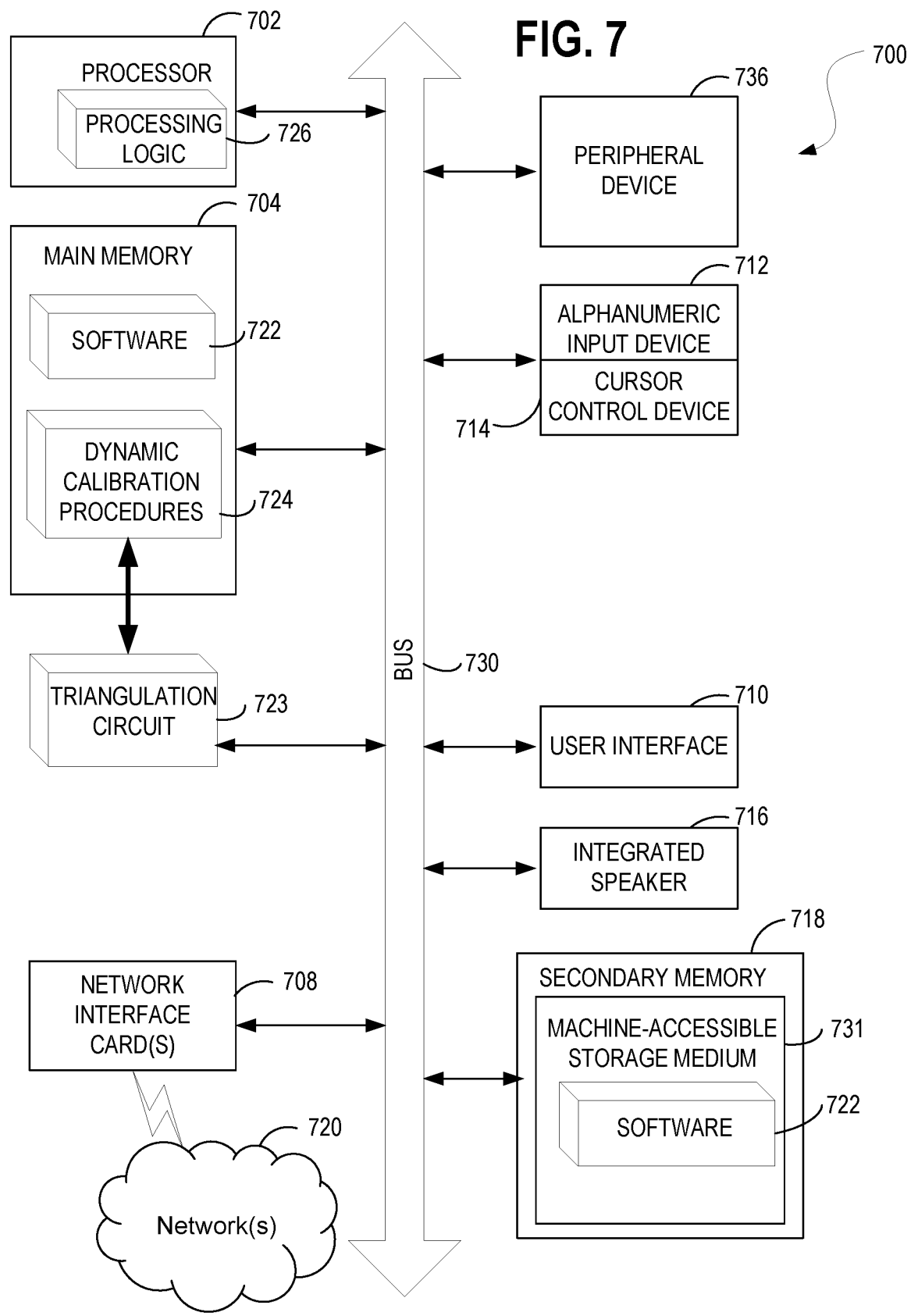

DYNAMIC DEPTH CAMERA SYSTEM CALIBRATION USING MOBILE DISPAY DEVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of image capture devices such as cameras, and more particularly, to systems, methods, and apparatuses for implementing smartphone based dynamic depth camera calibration.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

Conventional cameras capture a single image from a single optical focal point and are enabled to capture pixels corresponding to an object in a scene, but in so doing, such cameras lose the depth information for where within the scene the object is positioned in terms of depth or distance from the camera.

Conversely, stereo cameras have two or more lenses, each with a separate image sensor, and the two or more lenses allow the camera to capture three-dimensional images through a process known as stereo photography. With such conventional stereo cameras, trigonometrical triangulation is used to determine the depth to an object in a scene using a prior process known as correspondence.

Given two or more images of the same three-dimensional scene, taken from different points of view via the two or more lenses of the stereo camera, correspondence processing requires identifying a set of points in one image which can be correspondingly identified as the same points in another image by matching points or features in one image with the corresponding points or features in another image.

Depth camera systems require precise calibration in order to function properly. While such systems are calibrated at the time of manufacturer, it is desirable to enable consumers to re-calibrate such depth camera systems in-situ such as at home or while on the go, without necessitating such depth camera systems to be returned to a manufacturer or other specialist for calibration and without requiring specialized tools, equipment, or calibration targets to be carried and maintained by such consumers.

The present state of the art may therefore benefit from the systems, methods, and apparatuses for implementing smartphone based dynamic depth camera calibration as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 1A illustrates an exemplary methodology in accordance with which embodiments may operate;

FIGS. 1B and 1C provide a flow diagram illustrating an exemplary method for implementing a smartphone based dynamic depth camera calibration methodology in accordance with the described embodiments;

FIG. 3A illustrates an imaged pattern and a modeled pattern for calibration purposes in accordance with described embodiments;

FIG. 3B illustrates a 3D model depicting an overlay of the imaged pattern and the modeled pattern used for performing calibration correction in accordance with described embodiments;

FIGS. 5A and 5B depict a flow diagram illustrating a method for implementing smartphone based dynamic depth camera calibration in accordance with the described embodiments;

FIG. 7 illustrates a diagrammatic representation of a machine in the exemplary form of a computer system, in accordance with one embodiment.

DETAILED DESCRIPTION

Figure 2A:
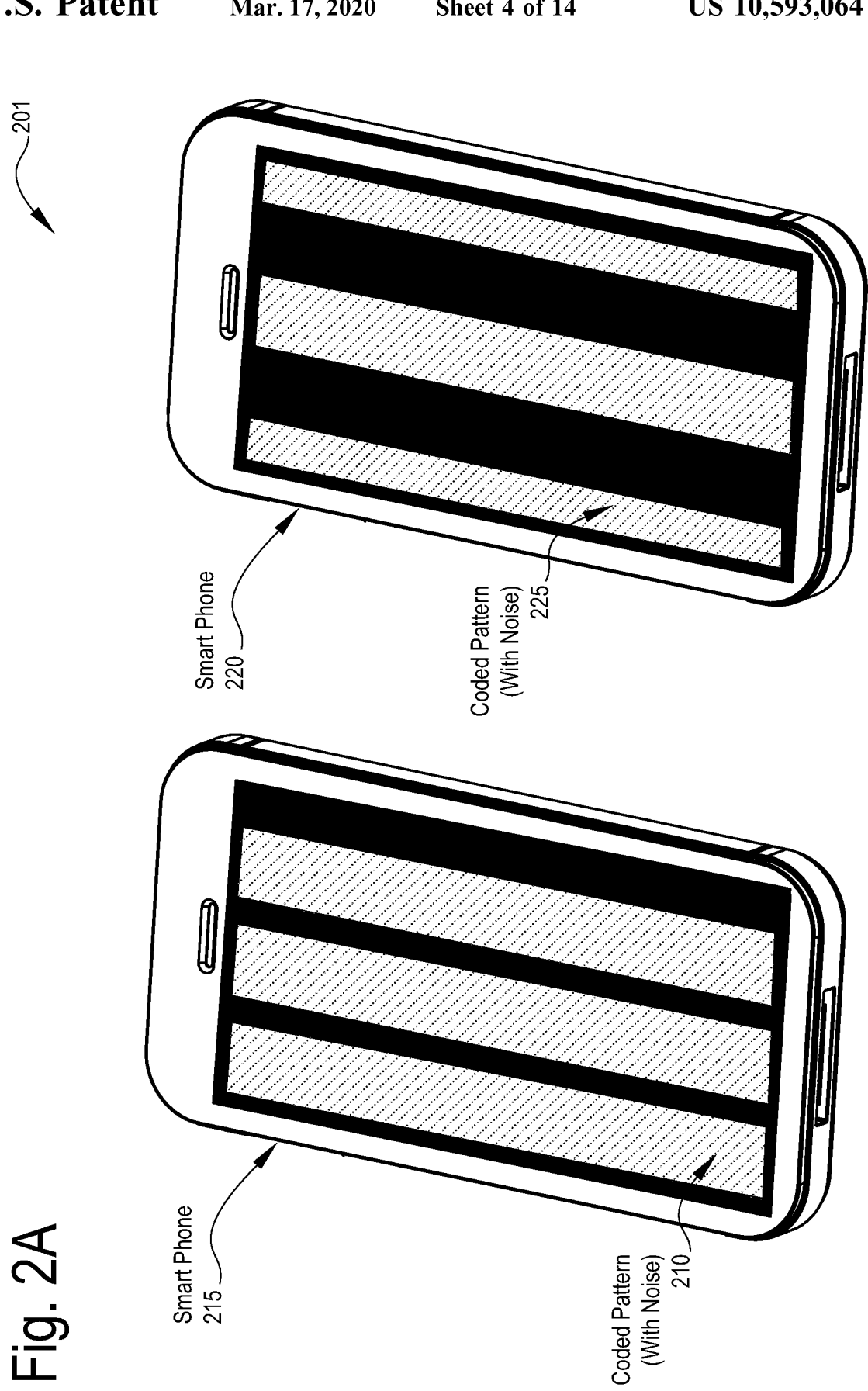
FIG. 2A illustrates exemplary smartphones having varying geometric target patterns displayed thereupon for calibration purposes in accordance with described embodiments.

Described herein are systems, methods, and apparatuses for implementing smartphone based dynamic depth camera calibration. For instance, there is described a depth camera calibration system which includes: a depth camera to be calibrated; a calibration application to execute upon a mobile device, the calibration application to: (i) determine a precise image size of a calibration image to be displayed to a screen of the mobile device based on a screen size of the mobile device, the calibration image having embedded therein a plurality of objects of a known size, (ii) encode the known size of the objects into an optical machine-readable data representation, and (iii) display the encoded optical machine-readable data representation to the mobile device; in which the depth camera is to read the optical machine-readable data representation displayed by the mobile device to determine the known size of the objects of the calibration image; in which the calibration application is to display the calibration image to the mobile device; and in which an imager of the depth camera is to capture the objects of the coded image pattern and calibrate based on the known size of the objects of the captured calibration image.

A single image of a scene captured via a single camera will have no depth information whatsoever for an object because given an imaginary ray originating from the focal point of the camera and extending to a point in the image, such as a pixel located on the object of the scene, it is impossible to determine whereupon the ray that pixel is located, and thus, it is unknown where the object is positioned within the scene.

There is ambiguity therefore with respect to the position of the object in the scene. Triangulation enables the recovery of this depth information so as to identify the position of an object in a scene, by determining where two rays intersect, one from each of two stereo cameras.

Conventionally, depth cameras operated on the basis of correspondence-based triangulation from stereo cameras to estimate depth. Such conventional stereo cameras seek to determine a depth from the position of the camera to, ideally, every pixel of an object within a captured image. With such cameras, triangulation operates by calculating the intersection between two rays, each of the two rays originating from two different optical systems.

When an image is captured by such conventional cameras, it is necessary to compute correspondence for the pixels within the captured image before triangulation may be applied to determine depth, distance, or range to any given pixel of an object within the image.

Correspondence calculations for three-dimensional imagery involve the identification of matching pixels for a given object in a scene amongst multiple captured images at the different optical systems, such that a subsequent triangulation operation may be performed. Depth cameras which rely upon correspondence derived triangulation therefore provide an appropriate means by which to determine depth, albeit through the use of increased computational demands.

Still other solutions utilize projection technology to introduce an active component into the scene to produce active stereo imagery or coded light imagery of the scene. Through such an approach it is possible to remove one of the cameras and replace it instead with a projector. For instance, the projector may then be utilized to project one-dimensional code onto the scene, such as a sequence of patterns which may subsequently be captured by the remaining camera and decoded.

Triangulation-based cameras such as the Intel F200 and SR300 depth cameras require accurate calibration in order to determine the exact intrinsic and extrinsic parameters of their components. Due to mechanical tolerances and phenomena such as heating, aging, mechanical shock, and so forth, these intrinsic/extrinsic parameters tend to change over time and through ordinary usage by consumers, thus taking the depth camera system out of its precise calibration and thus in turn, degrading the image quality.

Conventionally, recalibration of such depth camera systems requires a long and expensive process, involving special equipment such as a precision-manufactured calibration object as well as expert technical skills, both of which simply are not accessible to ordinary users in the marketplace, thus necessitating that in most instances, conventional depth camera systems must be shipped back to manufacturer for recalibration.

Another potential solution is to design and assemble depth camera systems with extremely stringent mechanical tolerances thus providing greater resilience of the depth camera system and longer ordinary usage periods before such a depth camera falls away from its original manufacturer calibrated intrinsic/extrinsic parameters. Unfortunately, such a strategy results in a dramatic increase in cost and form factor, thus making such systems impractical for many consumers as well as excessively costly to the end-user and thus unlikely to be competitive in the consumer marketplace.

Yet another potential solution which permits calibration in the field by end users requires the safe keeping of a physical calibration target provided by the manufacturer and shipped with the depth camera system, typically on a placard or other resilient material. Unfortunately, because the physical target must be delivered and maintained by the user throughout the lifetime of the camera, such a solution is difficult for consumers as such materials are likely to be lost or damaged over time. Moreover, such a solution is wholly impractical for mobile solutions such as smartphones and other small electronic devices having built-in depth camera systems as users simply will not carry around such physical targets with their mobile electronics.

Regardless of the methodology by which depth to an object is determined, the precise alignment of the components and circuitry within the depth camera imaging device is critical as even the slightest misalignment will cause the depth camera to yield inaccurate results and thus perform sub-optimally. While such depth cameras are precisely aligned at the time of manufacture, as they are used by consumers they are subjected to environmental stresses, such as changes in outside ambient temperature, changes in internal operating temperature, jarring, jostling, and other mechanical, thermal, and physical stresses which cause slight misalignments within the camera over time.

It is therefore provided in accordance with the described embodiments means by which to dynamically re-calibrate the depth camera utilizing imagery displayed by a smartphone in a precise and strictly enforced pattern as well as means by which to enable communication between the depth camera and the smartphone.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled with a computer system bus. The term "coupled" may refer to two or more elements which are in direct contact (physically, electrically, magnetically, optically, etc.) or to two or more elements that are not in direct contact with each other, but still cooperate and/or interact with each other.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1A illustrates an exemplary methodology 101 in accordance with which embodiments may operate. In particular, depicted are both a depth camera 105 and a smartphone 115 operating within the scene and in the line of sight 120 of the depth camera 105. As shown here, a user 110 is holding both the depth camera and the smartphone 115. In alternative embodiments, the depth camera may be stationary or embodied within a drone or alternatively the smartphone may be stationary or embodied within another device other than a handheld device.

Such a methodology 101 provides a calibration scenario for depth camera systems which does not require any special equipment or any special technical skills. Such a methodology 101 may therefore be performed by a by a non-professional user 110 at home or while on the go. By simplifying the calibration process, such depth camera 105 systems are made more accessible to consumers and thus encourages wider adoption into mainstream consumer electronics.

As depicted here, the primary calibration vehicle is the smartphone 115 which is being utilized here as a ground truth for a known geometric pattern or other target calibration shape by displaying a predefined geometrical pattern. By using the known smartphone calibration methodology 101 it is possible to display a coded pattern or a collection of geometric shapes of known dimensions in a known arrangement or pattern which may then imaged or captured by the depth camera 105 system for the purposes of performing precise depth calibration.

Performing dynamic calibration to a depth camera system requires a known and precise coded pattern or geometric shapes in a known configuration which may then be captured by the depth camera system's imager and then compared with an expected model of the same shape and configuration so as to determine any delta or differences between the captured imagery and the known model. Such an imager may be, for instance, a lens and CMOS (Complementary Metal-Oxide-Semiconductor) or an Active-Pixel Sensor (APS), etc.) or any other digital camera based image capture device. Based on the differences identified, calibration routines may then be applied to account for the differences when the depth camera is in use for capturing regular 3D imagery or other uses where the depth to an object is determined by the depth camera system as part of its ordinary use.

A smartphone 115 is an unacceptably imprecise tool by which to display any target calibration pattern due to the fact that different smartphone models have varying display resolutions, varying display densities, and varying physical screen sizes. Consequently, any displayed image will appear different from one smartphone to the next and therefore cannot be utilized for calibration purposes as the precise geometric arrangement of the shapes and patterns cannot be known to the depth camera in advance.

However, in accordance with described embodiments, different calibration images are provided for the varying smartphone 115 models, screen dimensions, resolutions, etc., such that different smartphones 115 can be made to display a target calibration pattern or coded image of a known size and dimension, thus providing a suitable calibration target.

FIGS. 1B and 1C provide a flow diagram illustrating an exemplary method 102 for implementing a smartphone based dynamic depth camera calibration methodology in accordance with the described embodiments.

Some of the blocks and/or operations listed below for method 102 are optional in accordance with certain embodiments. The numbering of the blocks presented is for the sake of clarity and is not intended to prescribe an order of operations in which the various blocks must occur. Method 102 may be performed by processing logic that may include hardware (e.g., circuitry, dedicated logic, programmable logic, microcode, etc.), software (e.g., instructions run on a processing device) to perform various operations such as executing, determining, capturing, optimizing, processing, displaying, encoding, etc., in pursuance of the systems and methods as described herein.

With reference first to FIG. 1B beginning at block 180, the method 102 starts with executing a calibration program at a depth camera system to be calibrated and executing a calibration application on a smartphone to display a calibration image.

At block 182, processing logic determines, via the calibration application the precise measurements of the smartphone screen size upon which the calibration image will be displayed.

At block 184, the calibration application encodes the precise measurements of the smartphone screen size into a QR code (e.g., a "Quick Response Code") and displays the QR code to the screen of the smartphone via the calibration application.

At block 186, the calibration application prompts the user to place the smartphone in front of and within the line of sight of the depth camera system until the QR code is acquired by the calibration program executing at the depth camera system.

At block 188, the calibration application executing at the smartphone displays the calibration image having a geometrical object with a known size to the smartphone screen. Such an object may be stripes, a checkerboard, any other pattern of a known size and geometry to the depth camera program. For passive stereo depth camera systems, the projected geometrical pattern may additionally be blended with patterned noise to permit improved depth reconstruction. The particularities of the displayed pattern, shapes, size, and patterned noise may be communicated to the depth camera program via the encoded QR code displayed by the smartphone and captured by the depth camera.

The method 102 continues with reference next to FIG. 1C beginning at block 190, in which the depth camera program executing at the depth camera will then prompt the user to acquire one or more images of the displayed calibration image having the geometric object therein. For instance, the depth camera program may instruct the user to capture the same image from multiple varying distances and at multiple varying view-angles.

At block 192, the depth camera program then applies two-dimensional (2D) image processing to detect the expected geometrical pattern in the captured one or more images of the geometric object.

At block 194, the depth camera program then applies optimization processing to the depth camera's parameters using the geometrical pattern from the geometric object unprojected into 3D space. For instance, optimizing the depth camera's parameters utilizing the dimensions of the geometrical pattern, such as the width of the stripes of a displayed calibration image.

At block 196, the depth camera program determines, via the optimization processing, a delta between geometrical pattern ground truth dimensions against the un-projected geometrical pattern dimensions captured by the depth camera from the displayed geometric object of the calibration image.

FIG. 2A illustrates exemplary smartphones 215 and 220 having varying geometric target patterns 210 and 225 displayed thereupon for calibration 201 purposes in accordance with described embodiments.

For instance, there is depicted on the left smartphone 215 geometric target patterns 210 which are optionally embedded with noise (e.g., such as pseudorandom noise, static, or structured noise) to aid the depth camera with capture and depth reconstruction processes. The geometric target pattern 210 on the left provides a series of three vertical stripes having a known and fixed width and a known and fixed geometry and a known and fixed intervening space between them. Similarly, the smartphone 220 on the right depicts a geometric target pattern 225 also with optional noise, in which the three vertical stripes are spaced a greater distance apart and have varying widths. However, as with the first geometric target image pattern 210, the spacing, width, and geometric arrangement of the stripes forming the second geometric target pattern 225 are of a fixed and known size and dimension.

Passive stereo depth camera systems specifically have difficulty reading crisp clean lines or textureless features, such as a blank sheet of paper or a white wall. The noise embedded within the displayed objects therefore aids the passive stereo type depth cameras in improving the depth determination by better differentiating where the perimeter of the displayed objects start and stop.

Through the use of such geometric target patterns 210 and 225 an ordinary consumer without any special skills or tools is enabled to perform a dynamic calibration process for their depth camera system, regardless of whether such a system is embedded in a mobile device, a home gaming system, a computer, or other consumer electronics device.

Dynamic calibration permits the user to re-calibrate the depth camera system outside of the manufacturing environment, for instance, at home or while on the go if the depth camera system is embedded within a mobile consumer electronics device.

Such dynamic calibration procedures must be based upon a known geometry or some collection or arrangement of known shapes having known dimensions.

One approach could be to provide an image to the user and request they print it for the purposes of calibration, but of course, this requires that the user have a printer and further requires that the printed image be of sufficient print quality further that the printer does not erroneously alter the dimensions of the image by even a slight amount, as any alteration to the size and arrangement of the image will degrade the dynamic calibration process. Consider for instance that many printers automatically adjust the margins of a printed image so as to permit a sufficient boundary around the paper upon which the image is printed. Such changes may alter the geometry of the calibration image and thus degrade the dynamic calibration process. Moreover, the ink utilized in the printing process must be viewable in the infrared (IR) range so as to be observable to an IR camera of the depth camera system during the dynamic calibration process, and the user is unlikely to know whether or not the ink in their particular printer is compatible.

Consequently, such procedures would be of limited use to the consumer as it is unlikely a user with a mobile device has a printer readily available and it is further problematic to print the image with sufficient precision and of a satisfactory quality.

According to a particular embodiment, the smartphone 215 and 220 knows its precise screen size (e.g., the information is stored internally within non-transitory memory of the smartphone device), and such information may be determinable by a calibration application which executes on the user's smartphone. For instance, the screen size and other pertinent details such as the screen resolution, pixel density, and precise viewable dimensions may be stored within a system configuration of the smartphone and therefore accessible to the calibration application when running on the user's smartphone given adequate access permissions. In other instances, the model is readily determinable and may be cross-referenced to identify the precise screen size and dimensions of the user's smartphone via a lookup chart embedded within the calibration application or via a cloud-connected service accessible to the calibration application. For instance, the calibration application may communicate from the user's mobile device with a server to perform a look up or determine the precise dimensions and screen size for the smartphone model upon which the calibration application is presently executing. Alternatively, when the user downloads the application to the smartphone, the download and configuration process may determine and save within the storage of the smartphone the precise dimensions and screen size for the smartphone being utilized.

According to another embodiment, the calibration application is configured to always present a calibration image of a pre-defined size, such as 20 mm stripes, regardless of the screen size, resolution, or pixel density. In such an embodiment, the calibration application will locally calculate, without having to reference an external server, the precise dimensions of the image to be displayed such that the absolute measurements (e.g., when physically measured from the displayed image) correspond to the pre-defined size, thus, the 20 mm stripes in this particular example.

Because the precise dimensions and screen size of the user's smartphone are knowable or determinable via the calibration application, when the application projects or displays a calibration image upon the display screen of the user's smartphone, the precise size and geometry is also deterministic and may therefore be utilized for the dynamic calibration procedure in which precise shapes and objects of a known size, dimension, and arrangement are provided at the display screen for capture by the depth camera's imager either in infrared or visible light, depending on the particular implementation of the calibration procedure.

Figure 2B:
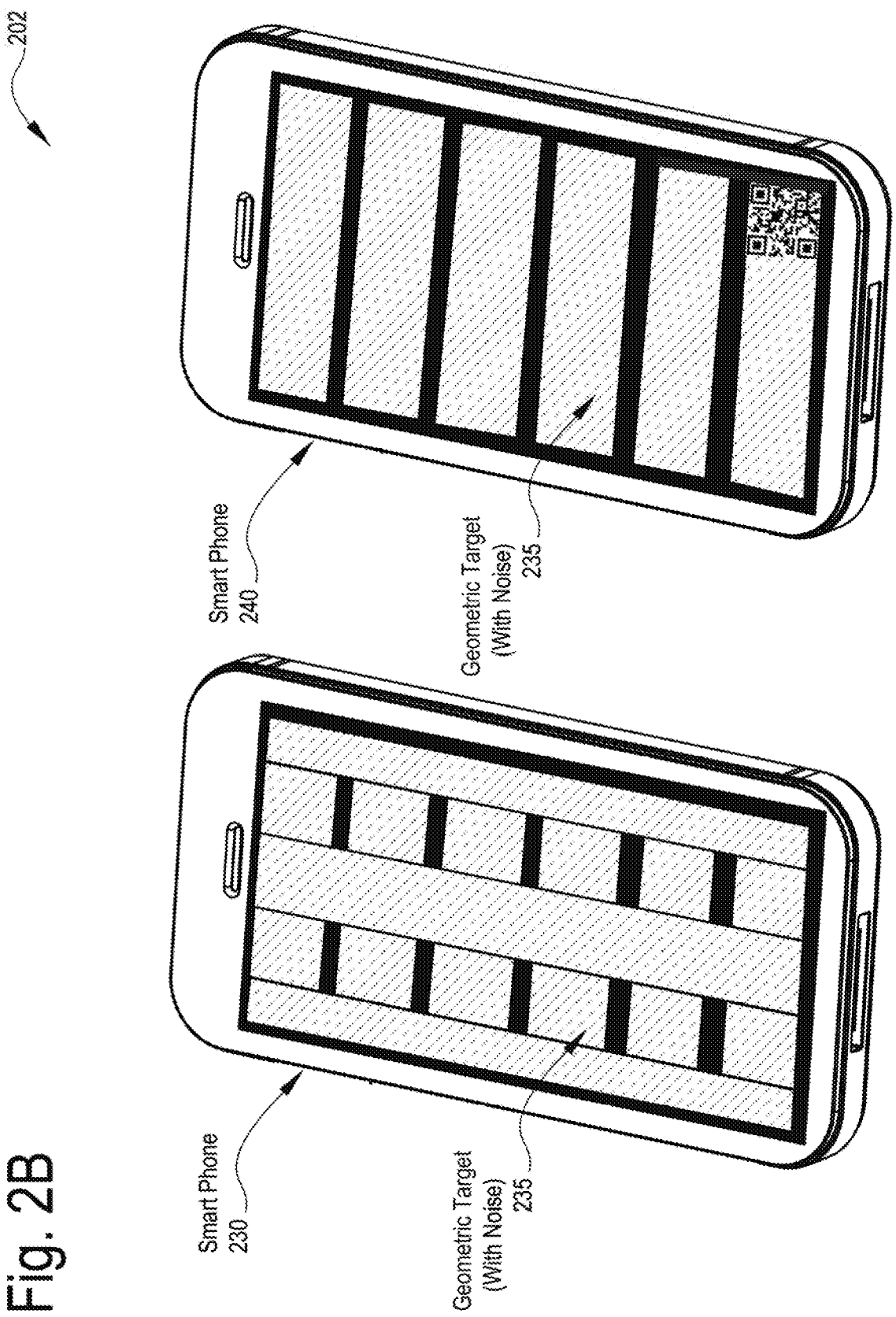
FIG. 2B illustrates exemplary smartphones having alternative geometric target patterns displayed thereupon for calibration purposes in accordance with described embodiments.

FIG. 2B illustrates exemplary smartphones 230 and 240 having alternative geometric target patterns 235 displayed thereupon for calibration 202 purposes in accordance with described embodiments.

More particularly, there are depicted here varying blocks forming a type of grid between three stripes within the geometric target pattern 235 of the left smartphone 230 and the smartphone 240 on the right presents to its display screen a coded image with horizontal stripes, again, with such stripes and blocks being of a known size, spatial configuration, and dimensionality, regardless of their particular arrangement. The calibration image which displays the geometric target patterns 235 may be formed from a checkerboard, stripes, blocks, or any other shape useful for performing the dynamic calibration procedure, so long as the geometry and size are precisely displayed and known to the depth camera program executing on the depth camera system. As noted above, such information may be communicated to the depth camera by the smartphone through an optical machine-readable data representation such as a QR code, or a barcode, or other decipherable pattern capable of being encoded by the smartphone and optically read (e.g., captured via an image capture device) and deciphered by the depth camera. Such a barcode may be an automatic identification and data capture (AIDC) compliant barcode or a Universal Product Code (UPC) compliant barcode. Similarly, the QR code may be any matrix or 2D type barcode including a QR code compliant 2D barcode capable of having the relevant screen size and geometric object information encoded therein by the calibration application for display to and optical capture by the depth camera.

For instance, based on information encoded into the QR code by the smartphone and displayed for capture to the depth camera, the depth camera can determine the precise stripe size, orientation, and dimensions, such that the depth camera may then model the geometric target pattern precisely based on the provided geometric information provided by the QR code. For instance, the QR code encoded and displayed by the smartphone may inform the depth camera that the stripes are precisely 20 mm wide and have a spacing of 8 mm between them and a height of 120 mm, and so forth. Because the precise dimensions of the screen are known, the calibration application is capable of producing an image having precise absolute measurements despite the fact that the identical calibration image would exhibit different size and dimensions if displayed by a different model of smartphone.

Subsequent to capture of the QR code, the depth camera may then image or capture the displayed geometric target pattern and compare the imaged pattern with the captured geometric target pattern to ascertain a delta or difference between them, with such differences then being utilized for a calibration correction.

FIG. 3A illustrates an imaged pattern 310 and a modeled pattern 315 for calibration 301 purposes in accordance with described embodiments.

Specifically, there is at the top an imaged pattern 310 representing the coded image pattern as displayed by the smartphone and captured via the imager such as an IR detector or an RGB (Red, Green, Blue) color camera of the depth camera. Once captured, the depth camera models the imaged pattern 310 within a 3D space for subsequent comparison with the modeled pattern 315.

The modeled pattern 315 depicts the version of the coded pattern as modeled within the 3D space by the depth camera based on the known dimensions, shape, configuration, and orientation of the objects within the coded pattern as communicated to the depth camera by the smartphone via the QR code or barcode. The modeled pattern 315 is not captured via the depth camera's IR detector or RGB color cameras, but rather, is mathematically constructed from the geometric information encoded into the QR image or barcode.

FIG. 3B illustrates a 3D model 302 depicting an overlay of the imaged pattern and the modeled pattern 305 used for performing calibration correction 350 in accordance with described embodiments.

The calibration program executing at the depth camera then produces an overlay of the imaged pattern and the modeled pattern 305 within the 3D model space, thus revealing a calibration correction 350 which is the delta between the imaged pattern and the modeled pattern 305. Once the calibration correction 350 is obtained, the depth camera will apply the calibration correction to captured imagery during normal use so as to improve the accuracy of the depth determination and triangulation functionality of the depth camera system.

Figure 4:
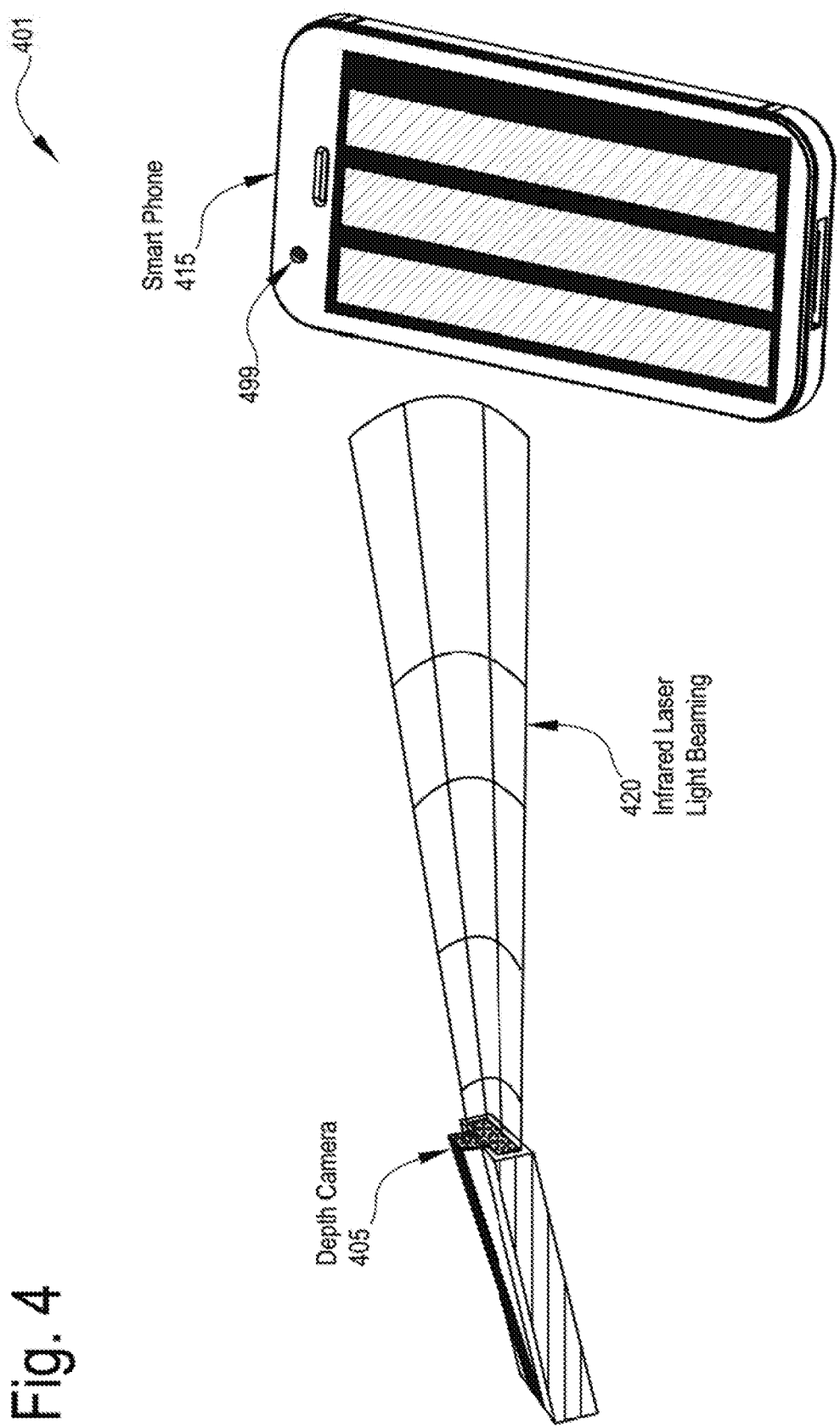
FIG. 4 depicts an alternative depth camera transmitting an infrared laser light beam to the smartphone for communication from the depth camera to the smartphone in accordance with described embodiments.

FIG. 4 depicts an alternative depth camera 405 transmitting an infrared laser light beam 420 to the smartphone 415 for communication 401 from the depth camera to the smartphone in accordance with described embodiments.

More particularly, the depth camera 405 is shown here as sending information back to the smartphone 415 via the infrared laser light beam 420 coded information to the smartphone which may then be detected by a camera 499 or imaging device of the smartphone 415. For instance, the depth camera may establish a two-way communication 401 channel between the smartphone and the depth camera by having the smartphone display images on the display screen with encoded information, such as the screen size or other information within a barcode or QR code which may be imaged by the depth camera and the depth camera may return information or send information to the smartphone via infrared laser light 420 beamed toward the smartphone such that the camera of the smartphone may detect the signal. Such a signal may be, for instance, pulses of infrared light, or another information carrying encoded signal.

In such a way, the calibration application and the calibration program executing at the depth camera may communicate with one another. Such a two way communication channel permits the depth camera to request the smartphone to display additional calibration images, display a different calibration image, execute an audible prompt to the user to re-position the camera or the smartphone, steady the smartphone for image capture, and so forth.

FIGS. 5A and 5B depict a flow diagram illustrating a method 500 for implementing smartphone based dynamic depth camera calibration in accordance with the described embodiments.

Some of the blocks and/or operations listed below for method 500 are optional in accordance with certain embodiments. The numbering of the blocks presented is for the sake of clarity and is not intended to prescribe an order of operations in which the various blocks must occur. Method 500 may be performed by processing logic that may include hardware (e.g., circuitry, dedicated logic, programmable logic, microcode, etc.), software (e.g., instructions run on a processing device) to perform various operations such as projecting, capturing, adjusting, outputting, decoding, triangulating, normalizing, controlling, analyzing, collecting, monitoring, executing, presenting, interfacing, receiving, processing, determining, triggering, displaying, etc., in pursuance of the systems and methods as described herein. For example, depth cameras 105 as depicted at FIG. 1A and depth camera 405 as depicted by FIG. 4, the smartphone or tablet computing devices as depicted at FIGS. 7A, 7B, and 7C, or the machine 800 at FIG. 8, may implement the described methodologies.

With reference method 500 beginning at FIG. 5A, block 505 begins with processing logic for performing smartphone based dynamic depth camera calibration, by the following operations.

At block 510, processing logic executes a calibration application via a processor and a memory of a smartphone.

At block 515, processing logic executes a calibration program at a depth camera to be calibrated.

At block 520, processing logic determines, via the calibration application, a precise image size of a calibration image to be displayed to a screen of the smartphone based on a screen size of the smartphone, the calibration image having embedded therein a plurality of objects of a known size.

At block 525, processing logic encodes, via the calibration application, the known size of the objects into an optical machine-readable data representation.

At block 530, processing logic displays, via the screen of the smartphone, the encoded optical machine-readable data representation.

With reference now to FIG. 5B, method 500 continues with block 535 where processing logic reads, via the calibration program executing at the depth camera, the optical machine-readable data representation displayed by the smartphone to determine the known size of the objects of the calibration image.

At block 540, processing logic displays, via the screen of the smartphone, the calibration image.

At block 545, processing logic captures, via an imager of the depth camera, the objects of the coded image pattern.

At block 550, processing logic calibrates, via the calibration program executing at the depth camera, the depth camera based on the known size of the objects of the captured calibration image.

Figure 6A:
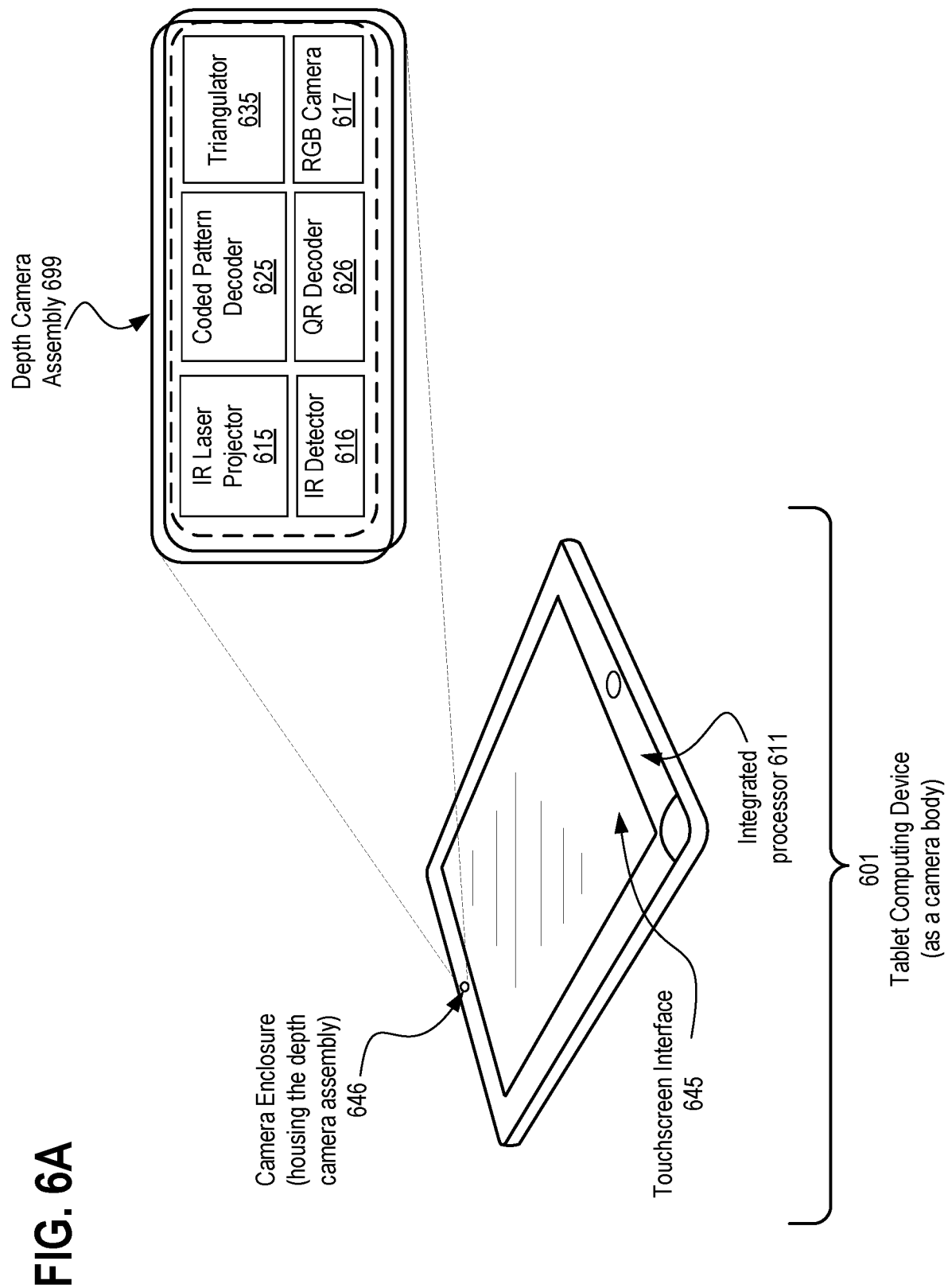
FIG. 6A illustrates an exemplary tablet computing device with a camera enclosure housing the depth camera assembly in accordance with described embodiments.
Figure 6B:
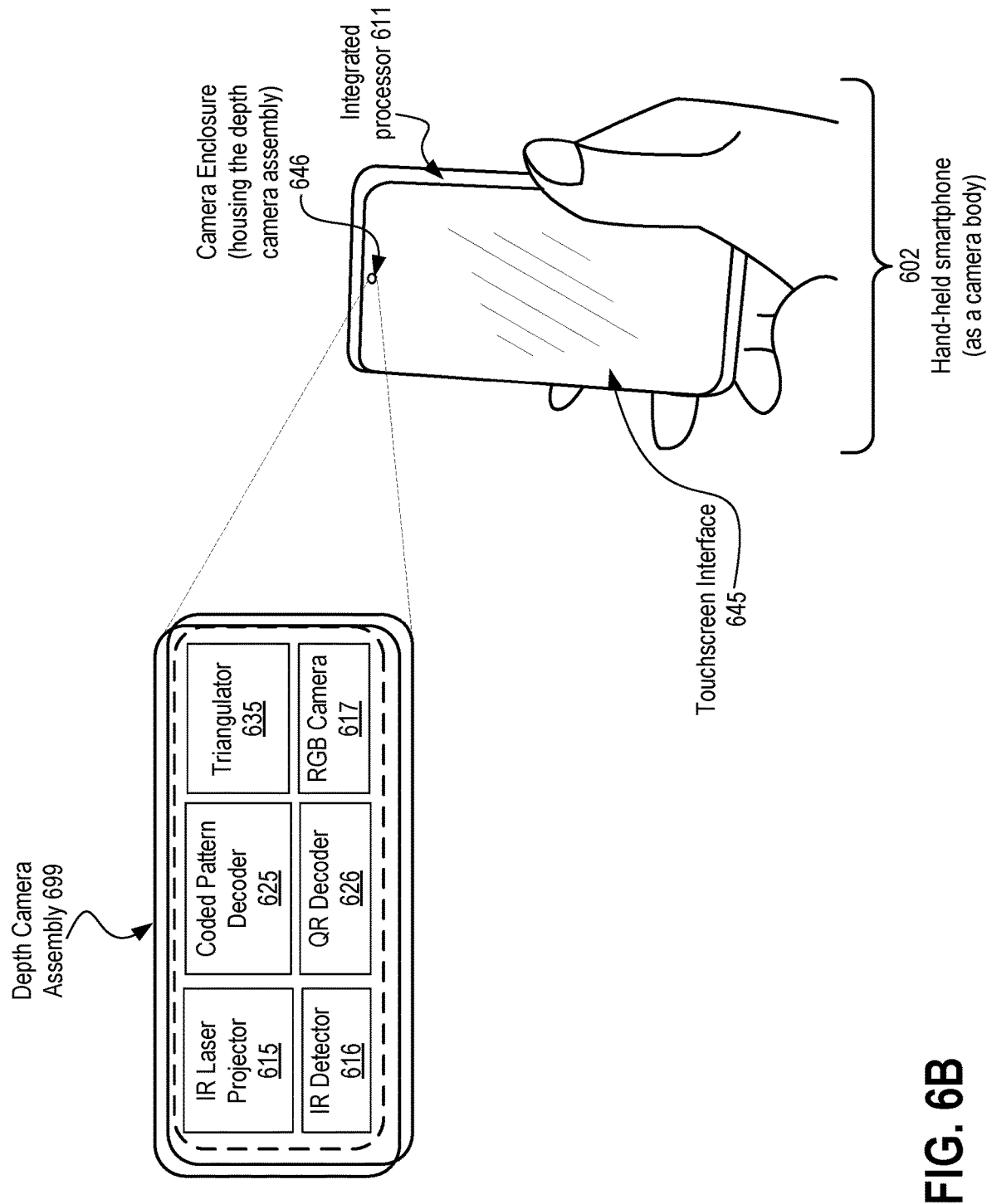
FIG. 6B illustrates an exemplary hand-held smartphone with a camera enclosure housing the depth camera assembly in accordance with described embodiments.

FIG. 6A illustrates an exemplary tablet computing device 601 with a camera enclosure 646 housing the depth camera assembly 699 in accordance with described embodiments and FIG. 6B illustrates an exemplary hand-held smartphone 602 with a camera enclosure 646 housing the depth camera assembly 699 in accordance with described embodiments.

For instance, according to the described embodiments, the depth camera assembly 699 having the necessary optics (e.g., lenses) of the projector infrared (IR) laser projector 615, infrared (IR) detector 616, as well as the coded pattern decoder 625, QR decoder 626 (or a barcode decoder), triangulator 635, and an RGB camera 617 therein, as described previously, is integrated within a hand-held smartphone 602 or tablet computing device 601 as a camera body for the depth camera assembly 699.

In accordance with one embodiment, the handheld smartphone 602 or tablet computing device 601 having a touchscreen interface 645 integrated therein forms the camera body to which the depth camera assembly 699 is integrated or installed.

FIGS. 6A and 6B depict the tablet computing device 601 and the hand-held smartphone 602 each having a circuitry integrated therein as described in accordance with the embodiments. As depicted, each of the tablet computing device 601 and the hand-held smartphone 602 include a touchscreen interface 645 and an integrated processor 611 in accordance with disclosed embodiments.

For example, in one embodiment, a tablet computing device 601 or a hand-held smartphone 602, includes a display unit which includes a touchscreen interface 645 for the tablet or the smartphone and further in which memory and an integrated circuit operating as an integrated processor are incorporated into the tablet or smartphone, in which the integrated processor is operable in conjunction with the depth camera assembly 699 and its components and circuitry as described herein; the tablet or smartphone and its processing components being further operable to perform image projection, image capture and image processing to perform dynamic calibration including implementing calibration corrections and adjustments and triangulation to determine depth information to an object of a scene. In one embodiment, the integrated circuit described above or the depicted integrated processor of the tablet or smartphone is an integrated silicon processor functioning as a central processing unit (CPU) and/or a Graphics Processing Unit (GPU) for a tablet computing device or a smartphone.

Figure 6C:
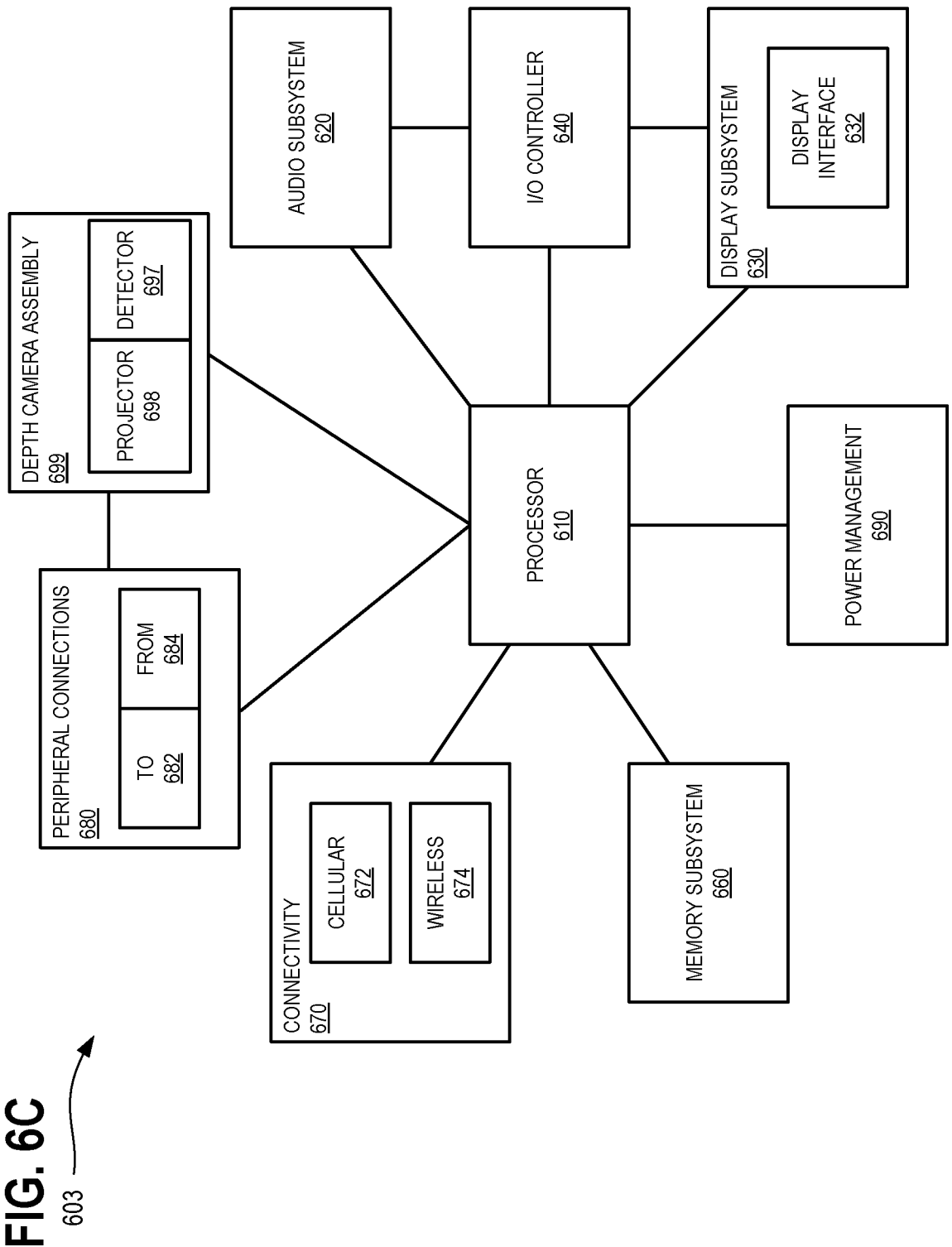
FIG. 6C is a block diagram of an embodiment of tablet computing device, a smartphone, or other mobile device in which touchscreen interface connectors are used in accordance with described embodiments.

FIG. 6C is a block diagram 603 of an embodiment of tablet computing device, a smartphone, or another mobile device in which touchscreen interface connectors are used in accordance with described embodiments. Processor 610 performs the primary processing operations. Audio subsystem 620 represents hardware (e.g., audio hardware and audio circuits) and software (e.g., drivers, codecs) components associated with providing audio functions to the computing device. In one embodiment, a user interacts with the tablet computing device or smartphone by providing audio commands that are received and processed by processor 610.

Depth camera assembly 699 is depicted as communicably interfaced to the processor 610 and peripheral connections 680. Depth camera assembly 699 includes the projector 698 and detector 697.

Display subsystem 630 represents hardware (e.g., display devices) and software (e.g., drivers) components that provide a visual and/or tactile display for a user to interact with the tablet computing device or smartphone. Display subsystem 630 includes display interface 632, which includes the particular screen or hardware device used to provide a display to a user. In one embodiment, display subsystem 630 includes a touchscreen device that provides both output and input to a user.

I/O controller 640 represents hardware devices and software components related to interaction with a user. I/O controller 640 can operate to manage hardware that is part of an audio subsystem 620 and/or display subsystem 630. Additionally, I/O controller 640 illustrates a connection point for additional devices that connect to the tablet computing device or smartphone through which a user might interact. In one embodiment, I/O controller 640 manages devices such as accelerometers, cameras, light sensors or other environmental sensors, or other hardware that can be included in the tablet computing device or smartphone. The input can be part of direct user interaction, as well as providing environmental input to the tablet computing device or smartphone.

In one embodiment, the tablet computing device or smartphone includes power management 690 that manages battery power usage, charging of the battery, and features related to power saving operation. Memory subsystem 660 includes memory devices for storing information in the tablet computing device or smartphone. Connectivity 670 includes hardware devices (e.g., wireless and/or wired connectors and communication hardware) and software components (e.g., drivers, protocol stacks) to the tablet computing device or smartphone to communicate with external devices. Cellular connectivity 672 may include, for example, wireless carriers such as GSM (global system for mobile communications), CDMA (code division multiple access), TDM (time division multiplexing), or other cellular service standards). Wireless connectivity 674 may include, for example, activity that is not cellular, such as personal area networks (e.g., Bluetooth), local area networks (e.g., WiFi), and/or wide area networks (e.g., WiMax), or other wireless communication.

Peripheral connections 680 include hardware interfaces and connectors, as well as software components (e.g., drivers, protocol stacks) to make peripheral connections as a peripheral device ("to" 682) to other computing devices, as well as have peripheral devices ("from" 684) connected to the tablet computing device or smartphone, including, for example, a "docking" connector to connect with other computing devices. Peripheral connections 680 include common or standards-based connectors, such as a Universal Serial Bus (USB) connector, DisplayPort including MiniDisplayPort (MDP), High Definition Multimedia Interface (HDMI), Firewire, etc.

FIG. 7 illustrates a diagrammatic representation of a machine 700 in the exemplary form of a computer system, in accordance with one embodiment, within which a set of instructions, for causing the machine/computer system 700 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein including implementing smartphone based dynamic depth camera calibration.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 718 (e.g., a persistent storage device including hard disk drives and a persistent database and/or a multi-tenant database implementation), which communicate with each other via a bus 730. Depth processing may be performed by software or hardware or performed by a combination of hardware and software. Depicted here is main memory 704 which includes software 722 and dynamic calibration procedures 724 providing functionality for the dynamic calibration program to execute on the depth camera as well as the smartphone dynamic calibration application which is to execute on a smartphone used to display the calibration image(s). The triangulation circuit 723 operates as a depth processor circuit capable of performing stereo processing to identify points of interest as well as performing correspondence and triangulation. Dynamic calibration may execute on a host and receive the depth image and the infrared (IR) images from two IR cameras. In other embodiments, dynamic calibration may reside within an SOC system and read the depth processor output via the system bus 730. Main memory 704 and its sub-elements are operable in conjunction with processing logic 726 and processor 702 to perform the methodologies discussed herein.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and functionality which is discussed herein including interfacing to the depth camera and/or performing processing on behalf of such a depth camera.

The computer system 700 may further include a network interface card 708. The computer system 700 also may include a user interface 710 (such as a video display unit, a liquid crystal display (LCD), touch screen, or a cathode ray tube (CRT)), an alphanumeric input device 712 (e.g., a keyboard), a cursor control device 714 (e.g., a mouse), and a signal generation device such as an integrated speaker 716. The computer system 700 may further include peripheral device 736 (e.g., wireless or wired communication devices, memory devices, storage devices, audio processing devices, video processing devices, etc.).

The secondary memory 718 may include a non-transitory machine-accessible or computer readable storage medium 731 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-readable storage media. The software 722 may further be transmitted or received over a network 720 via the network interface card 708.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

It is therefore in accordance with the variously described embodiments, that:

According to one embodiment there is a depth camera system which includes: a depth camera to be calibrated; a calibration application to execute upon a mobile device, the calibration application to: (i) determine a precise image size of a calibration image to be displayed to a screen of the mobile device based on a screen size of the mobile device, the calibration image having embedded therein a plurality of objects of a known size, (ii) encode the known size of the objects into an optical machine-readable data representation, and (iii) display the encoded optical machine-readable data representation to the mobile device; in which the depth camera is to read the optical machine-readable data representation displayed by the mobile device to determine the known size of the objects of the calibration image; in which the calibration application is to display the calibration image to the mobile device; and in which an imager of the depth camera is to capture the objects of the coded image pattern and calibrate based on the known size of the objects of the captured calibration image.

According to another embodiment of the depth camera calibration system, the plurality of objects having the known size encoded into the optical machine-readable data representation form a coded image pattern displayed to the depth camera via the screen of the smartphone.

According to another embodiment of the depth camera calibration system, the objects of the calibration image include a plurality of stripes having a size and dimension matching the precise image size determined by the calibration application.

According to another embodiment of the depth camera calibration system, the objects are populated with noise by the calibration application to improve depth determination by a passive stereo type depth camera system.

According to another embodiment of the depth camera calibration system, the imager of the depth camera includes at least a lens and a digital image capture device formed from a Complementary Metal-Oxide-Semiconductor (CMOS) type integrated circuit or an Active-Pixel Sensor (APS) type integrated circuit.

According to another embodiment of the depth camera calibration system, the optical machine-readable data representation includes one of a Quick Response (QR) code, a barcode, or a two-dimensional matrix barcode.

According to another embodiment of the depth camera calibration system, the depth camera includes at least a processor and a memory to execute instructions; in which the imager embodied within the depth camera is to read the optical machine-readable data representation displayed by the smartphone via optical image capture; and in which the depth camera is to decode the known size of the objects from the encoded optical machine-readable data representation read by the imager.

According to another embodiment of the depth camera calibration system, the imager of the depth camera includes an infrared (IR) detector; and in which the imager of the depth camera to capture the objects of the coded image pattern includes the depth camera detecting the objects in the infrared light range.

According to another embodiment, the depth camera calibration system further includes: a mobile device having at least a processor and a memory therein to execute instructions; in which the calibration application is to execute upon the mobile device via the processor and memory of the mobile device; and in which the calibration application to determine the precise image size of a calibration image to be displayed includes one of: (a) the calibration application to read configuration information defining the screen size of the mobile device from storage of the mobile device and calculate the precise image size of the calibration image based on the determined screen size and a pre-defined size for the calibration image; or (b) the calibration application to read a model of the mobile device and query a cloud service for the screen size of the mobile device and calculate the precise image size of the calibration image based on the returned screen size and the pre-defined size for the calibration image.

According to another embodiment, the depth camera calibration system further includes: an infrared laser embodied within the depth camera to transmit via an infrared laser beam encoded messages from the depth camera to the smartphone; in which a camera embodied within smartphone is to decode the messages and respond based on the messages transmitted from the depth camera.

According to another embodiment of the depth camera calibration system, the smartphone to respond to the depth camera based on the messages transmitted includes at least one of: the smartphone to display a different calibration image; the smartphone to prompt a user to reposition the smartphone at a greater or lesser distance from the depth camera; or the smartphone to prompt a user to reposition the smartphone at a different view-angle relative to the depth camera.

According to another embodiment, the depth camera calibration system further includes: a calibration program to execute on the depth camera; in which the depth camera to calibrate based on the known size of the objects of the captured calibration image includes the calibration program of the depth camera to: (a) create in three-dimensional space a modeled pattern based on the known size of the objects as encoded within the optical machine-readable data representation; (d) create in the three-dimensional space an imaged pattern based on the captured objects of the coded image pattern; and (c) compare the modeled pattern with the imaged pattern to determine a difference.

According to another embodiment of the depth camera calibration system, the calibration program of the depth camera to compare the modeled pattern with the imaged pattern to determine the difference includes the calibration program to generate a calibration correction based on the difference between the modeled pattern and the imaged pattern.

In accordance with yet another embodiment there is a method for performing smartphone based dynamic depth camera calibration, in which the method includes: executing a calibration application via a processor and a memory of a smartphone; executing a calibration program at a depth camera to be calibrated; determining, via the calibration application, a precise image size of a calibration image to be displayed to a screen of the smartphone based on a screen size of the smartphone, the calibration image having embedded therein a plurality of objects of a known size, encoding, via the calibration application, the known size of the objects into an optical machine-readable data representation; displaying, via the screen of the smartphone, the encoded optical machine-readable data representation; reading, via the calibration program executing at the depth camera, the optical machine-readable data representation displayed by the smartphone to determine the known size of the objects of the calibration image; displaying, via the screen of the smartphone, the calibration image; capturing, via an imager of the depth camera, the objects of the coded image pattern; and calibrating, via the calibration program executing at the depth camera, the depth camera based on the known size of the objects of the captured calibration image.

According to another embodiment of the method, the objects of the calibration image include a plurality of stripes having a size and dimension matching the precise image size determined by the calibration application.

According to another embodiment, the method further includes: populating the displayed objects with noise via the calibration application to improve depth determination by a passive stereo type depth camera system embodied by the depth camera.

According to another embodiment of the method, the imager of the depth camera includes at least a lens and a digital image capture device formed from a Complementary Metal-Oxide-Semiconductor (CMOS) type integrated circuit or an Active-Pixel Sensor (APS) type integrated circuit.

According to another embodiment of the method, the optical machine-readable data representation includes one of a Quick Response (QR) code, a barcode, or a two-dimensional matrix barcode.

According to another embodiment of the method, the imager of the depth camera includes an infrared (IR) detector; and in which capturing the objects of the coded image pattern includes detecting, via the infrared detector of the depth camera, the objects in the infrared light range.

According to another embodiment of the method, determining the precise image size of the calibration image to be displayed includes one of: (a) reading, via the calibration application, configuration information defining the screen size of the smartphone from storage of the smartphone and calculate the precise image size of the calibration image based on the determined screen size and a pre-defined size for the calibration image; or (b) reading, via the calibration application, a model of the smartphone and query a cloud service for the screen size of the smartphone and calculate the precise image size of the calibration image based on the returned screen size and the pre-defined size for the calibration image.

According to another embodiment, the method further includes: transmitting, via an infrared laser embodied within the depth camera, encoded messages from the depth camera to the smartphone; capturing, via a camera of the smartphone, the encoded messages transmitted from the depth camera; and decoding, via the calibration application, the messages captured via the camera and responding based on the messages transmitted from the depth camera.

According to another embodiment of the method, responding based on the messages transmitted from the depth camera includes at least one of: displaying, via the screen of the smartphone, a different calibration image; prompting, via the calibration application, a user to reposition the smartphone at a greater or lesser distance from the depth camera; or prompting, via the calibration application, the user to reposition the smartphone at a different view-angle relative to the depth camera.

According to yet another embodiment there is non-transitory computer readable storage media having instructions stored thereupon that, when executed by a processor of a depth camera and a processor of a smartphone, the instructions cause the depth camera and the smartphone to perform operations including: executing a calibration application via the processor of the smartphone; executing a calibration program via a processor of the depth camera; determining, via the calibration application, a precise image size of a calibration image to be displayed to a screen of the smartphone based on a screen size of the smartphone, the calibration image having embedded therein a plurality of objects of a known size, encoding, via the calibration application, the known size of the objects into an optical machine-readable data representation; displaying, via the screen of the smartphone, the encoded optical machine-readable data representation; reading, via the calibration program executing at the depth camera, the optical machine-readable data representation displayed by the smartphone to determine the known size of the objects of the calibration image; displaying, via the screen of the smartphone, the calibration image; capturing, via an imager of the depth camera, the objects of the coded image pattern; and calibrating, via the calibration program executing at the depth camera, the depth camera based on the known size of the objects of the captured calibration image.

According to another embodiment of the non-transitory computer readable storage media, the instructions cause the depth camera and the smartphone to perform operations further including: transmitting, via an infrared laser embodied within the depth camera, encoded messages from the depth camera to the smartphone; capturing, via a camera of the smartphone, the encoded messages transmitted from the depth camera; and decoding, via the calibration application, the messages captured via the camera and responding based on the messages transmitted from the depth camera.

According to another embodiment of the non-transitory computer readable storage media, responding based on the messages transmitted from the depth camera includes at least one of: displaying, via the screen of the smartphone, a different calibration image; prompting, via the calibration application, a user to reposition the smartphone at a greater or lesser distance from the depth camera; or prompting, via the calibration application, the user to reposition the smartphone at a different view-angle relative to the depth camera.

What is claimed is:

1. A mobile device to calibrate a depth camera system, the mobile device comprising:
    a display screen;
    memory to store a projection application; and
    one or more processors to execute the projection application to determine a size of an image of a geometric target to be displayed upon the display screen, wherein the size of the image of the geometric target is determined based at least in part on a size and screen resolution of the display screen,
    encode the determined size of the image of the geometric target into an optical machine-readable data representation, the optical machine-readable data representation comprising one of a Quick Response (QR) code, a barcode, or a two-dimensional matrix barcode,
    cause display, to the display screen, of the optical machine-readable data representation, so that the depth camera system can read the optical machine-readable data representation to determine the size of the image of the geometric target encoded into the optical machine-readable data representation, and
    cause display, to the display screen, of the image of the geometric target, so the depth camera system can capture the displayed image of the geometric target and apply an optimization process to calibrate the depth camera system based on the encoded determined size of the image of the geometric target as displayed by the mobile device.

2. The mobile device of claim 1, wherein the one or more processors are further to execute the projection application to:
receive one or more encoded messages from the depth camera system; decode the one or more encoded messages; and
initiate a response based on the one or more messages, wherein the response includes cause display, via the display screen, of a different geometric target;
prompt a user to reposition the mobile device at a greater or lesser distance from the depth camera system; and/or
prompt the user to reposition the mobile device at a different view-angle relative to the depth camera system.

3. The mobile device of claim 1, wherein the one or more processors are further to execute the projection application to further embed the optical machine-readable data representation into the image of the geometric target.

4. The mobile device of claim 1, wherein the geometric target comprises a plurality of stripes or other geometrical objects, each stripe or geometrical object having a dimension that corresponds to the size of the image of the geometric target.

5. The mobile device of claim 1: wherein the geometric target comprises a plurality of objects;
wherein the objects are populated with noise by the projection application to improve depth determination by a stereo type depth camera system.

6. The mobile device of claim 1, wherein the mobile device is a smartphone or tablet, and includes a camera to receive light-based messages from the depth camera system, and the one or more processors are further to execute the projection application to initiate a response based on the light-based messages.

7. The mobile device of claim 1, wherein the one or more processors are further to execute the projection application to initiate a response based on a message received from the depth camera system.

8. A depth camera calibration system comprising: a depth camera to be calibrated;
a projection application to execute upon a mobile device having a display screen, the projection application to
(i) determine a size of an image of a geometric target to be displayed upon the display screen, wherein the size of the image of the geometric target is determined based at least in part on a size and screen resolution of a the display screen of the mobile device when the geometric target is displayed upon the screen of the mobile device,
(ii) encode the determined size of the image of the geometric target into an optical machine-readable data representation, the optical machine-readable data representation comprising one of a Quick Response (QR) code, a barcode, or a two-dimensional matrix barcode,
(iii) cause display, to the display screen, of the optical machine-readable data representation having the determined size of the image of the geometric target encoded therein, and
(iv) cause display, to the display screen, of the image of the geometric target; and
wherein the depth camera is to
(i) read the optical machine-readable data representation displayed by the mobile device to determine the size of the image of the geometric target encoded into the optical machine-readable data representation, and
(ii) capture the displayed image of the geometric target and apply an optimization process to calibrate the depth camera based on the encoded determined size of the image of the geometric target as displayed by the mobile device.

9. The depth camera calibration system of claim 8:
wherein the optical machine-readable data representation comprises a Quick Response (QR) code having the determined size of the image of the geometric target encoded therein; and
wherein the projection application is further to embed the encoded QR code into a sub-portion of the geometric target.

10. The depth camera calibration system of claim 8:
wherein the depth camera is integrated within a host system having at least a processor and a memory;
wherein a calibration program is to execute via the processor of the host system; and
wherein the calibration program is to apply the optimization process to calibrate the depth camera based on the known size of the image of the geometric target as displayed by the mobile device.

11. The depth camera calibration system of claim 10, wherein the host system having the depth camera integrated therein comprises one of:
a drone;
a robot;
an autonomous vehicle;
a personal computer;
a kiosk;
a gaming platform;
a gaming peripheral attached to the gaming platform;
a second mobile device;
a web-cam communicably interfaced with the personal computer;
a security camera; or
a wearable camera system.

12. The depth camera calibration system of claim 8, wherein the geometric target comprises a plurality of stripes or other geometrical objects, the stripes or other geometrical objects each having a dimension that, when displayed upon the display screen, matches the determined size of the image as encoded into the optical machine-readable data representation.

13. The depth camera calibration system of claim 8:
wherein the geometric target comprises a plurality of objects; and
wherein the objects are populated with noise by the projection application to improve depth determination by a stereo type depth camera system.

14. The depth camera calibration system of claim 8:
wherein the depth camera or a host system within which the depth camera is embodied comprises at least a processor and a memory to execute instructions;
wherein an imager embodied within the depth camera is to read the optical machine-readable data representation displayed by the mobile device via optical image capture; and
wherein the depth camera or host system is to decode the size of the image of the geometric target from the optical machine-readable data representation read by the imager.

15. The depth camera calibration system of claim 8:
wherein the depth camera includes an imager comprising a sensor to operate in the visible and/or Near Infra-red (NIR) wavelength;
wherein the imager is to capture the encoded optical machine-readable data representation and the geometric target as displayed by the display screen; and
wherein the imager is to detect the displayed optical machine-readable data representation and the displayed geometric target in the visible and/or near infrared light range.

16. The depth camera calibration system of claim 8, further comprising:
the mobile device having at least a processor and a memory, the memory containing instructions executable by the processor, the instructions being instructions of the projection application; and
wherein the projection application is to at least one of:
(a) read configuration information defining the display screen size from storage of the mobile device and calculate the size of the image of the geometric target based on the determined display screen size and a pre-defined size for the geometric target; and/or
(b) read a model of the mobile device and query a cloud service for the display screen size, and calculate the size of the image of the geometric target based on the returned display screen size and the pre-defined size for the geometric target.

17. The depth camera calibration system of claim 8, further comprising:
a Near Infrared (NIR) laser embodied within the depth camera to transmit encoded messages from the depth camera to the mobile device;
wherein a camera embodied within mobile device is to receive the encoded messages transmitted from the NIR laser; and
wherein the projection application is further to decode the received encoded messages and to respond.

18. The depth camera calibration system of claim 17, wherein the projection application responds by one or more of:
cause display of a different calibration image;
prompt a user to reposition the mobile device at a greater or lesser distance from the depth camera; and/or
prompt the user to reposition the mobile device at a different view-angle relative to the depth camera.

19. A non-transitory machine-readable medium encoded with instructions that when executed by one or more processors cause a process to be carried out for performing mobile device based dynamic depth camera calibration, the process comprising:
determine a size of an image of a geometric target to be displayed upon a display screen of a mobile device, wherein the size of the image of the geometric target is determined based at least in part on a size and screen resolution of the display screen;
encode the determined size of the image of the geometric target into an optical machine-readable data representation, the optical machine-readable data representation comprising one of a Quick Response (QR) code, a barcode, or a two-dimensional matrix barcode;
cause display, to the display screen, of the optical machine-readable data representation, so that a depth camera system can read the optical machine-readable data representation to determine the size of the image of the geometric target encoded into the optical machine-readable data representation; and
cause display, to the display screen, of the image of the geometric target, so the depth camera system can capture the displayed image of the geometric target and apply an optimization process to calibrate the depth camera system based on the encoded determined size of the image of the geometric target as displayed by the mobile device.

20. The non-transitory machine-readable medium of claim 19, the process further comprising:
populate objects displayed within the geometric target displayed by the display screen with noise.

21. The non-transitory machine-readable medium of claim 19, the process further comprising:
receive one or more encoded messages from the depth camera system; decode the one or more encoded messages; and
initiate a response based on the one or more messages, wherein the response includes cause display, via the display screen, of a different geometric target;
prompt a user to reposition the mobile device at a greater or lesser distance from the depth camera system; and/or
prompt the user to reposition the mobile device at a different view-angle relative to the depth camera system.

22. The non-transitory machine-readable medium of claim 19, the process further comprising: embed the optical machine-readable data representation into the image of the geometric target.

23. The non-transitory machine-readable medium of claim 19, wherein the geometric target comprises a plurality of stripes or other geometrical objects, each stripe or geometrical object having a dimension that corresponds to the size of the image of the geometric target.

24. The non-transitory machine-readable medium of claim 19, wherein the non-transitory machine-readable medium is included in the mobile device, and wherein the mobile device is a smartphone or tablet and includes a camera to receive light-based messages from the depth camera system, and the one or more processors are further to execute the projection application to initiate a response based on the light-based messages.

25. The non-transitory machine-readable medium of claim 19, the process further comprising: initiate a response based on a message received from the depth camera system.

* * * * *